(12) United States Patent
Nakakita et al.

(10) Patent No.: US 7,235,948 B2
(45) Date of Patent: Jun. 26, 2007

(54) FORKLIFT AND METHOD FOR CONTROLLING INDUCTION MOTOR APPLIED TO THE SAME

(75) Inventors: Osamu Nakakita, Kanagawa-ken (JP); Yoshimi Okazaki, Kanagawa-ken (JP); Masayuki Morimoto, Hyogo-ken (JP); Takao Sakurai, Aichi-ken (JP); Teruo Mizuno, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/337,475

(22) Filed: Jan. 24, 2006

(65) Prior Publication Data

US 2006/0192519 A1  Aug. 31, 2006

(30) Foreign Application Priority Data

Feb. 25, 2005  (JP) ............................. 2005-051368

(51) Int. Cl.
*H02P 27/04* (2006.01)
*B60L 11/18* (2006.01)
*B66F 9/075* (2006.01)

(52) U.S. Cl. .................. 318/801; 318/139; 318/802; 318/811; 475/5; 180/65.8

(58) Field of Classification Search ............... 318/139, 318/801, 802, 811; 475/5; 180/65.1, 65.5, 180/65.8; 701/50
See application file for complete search history.

(56) References Cited

U.S. PATENT DOCUMENTS

| 4,713,595 | A | * | 12/1987 | Yonemoto | 318/759 |
|---|---|---|---|---|---|
| 4,785,225 | A | * | 11/1988 | Horie et al. | 318/811 |
| 4,961,042 | A | * | 10/1990 | Imaseki | 318/758 |
| 4,994,973 | A | * | 2/1991 | Makino et al. | 701/50 |
| 5,278,485 | A | * | 1/1994 | Kim | 318/802 |
| 5,278,486 | A | * | 1/1994 | Kim | 318/811 |
| 5,635,689 | A | * | 6/1997 | Shepard et al. | 187/292 |
| 5,638,387 | A | * | 6/1997 | Palleggi et al. | 318/67 |
| 5,977,742 | A | * | 11/1999 | Henmi | 318/801 |
| 6,009,003 | A | * | 12/1999 | Yeo | 363/37 |
| 6,755,267 | B2 | * | 6/2004 | Yamada et al. | 180/65.8 |
| 7,053,568 | B2 | * | 5/2006 | Rudinec | 318/139 |
| 2002/0068655 | A1 | * | 6/2002 | Yamada et al. | 475/5 |
| 2003/0167114 | A1 | * | 9/2003 | Chen | 701/50 |
| 2006/0061309 | A1 | * | 3/2006 | Rudinec | 318/139 |

FOREIGN PATENT DOCUMENTS

| JP | 7-107797 A | 4/1995 |
|---|---|---|
| JP | 2002-176706 A | 6/2002 |

* cited by examiner

*Primary Examiner*—Paul Ip
(74) *Attorney, Agent, or Firm*—Birch, Stewart, Kolasch & Birch, LLP (57) ABSTRACT

A forklift having a cargo apparatus, the responsiveness of which to the operation by a user is improved. The forklift has: a DSP which generates a frequency instruction f* in response to the operation to a cargo apparatus operation lever, a voltage instruction V* from the frequency instruction f* by using the VVVF control, inverter control signals from the voltage instruction v*; an inverter which generates the three-phase electric power in response to the inverter control signal; a hydraulic pump; an induction motor driving a hydraulic pump by using the three-phase electric power; and a cargo apparatus which is driven by the hydraulic pressure supplied from the hydraulic pump.

12 Claims, 3 Drawing Sheets

FORKLIFT AND METHOD FOR CONTROLLING INDUCTION MOTOR APPLIED TO THE SAME

BACKGROUND OF THE INVENTION

1. Field of the Invention

The present invention relates to a forklift, and more particularly relates to a forklift using an induction motor in order to generate the driving force of a cargo apparatus.

2. Description of the Related Art

In a typical conventional battery forklift, the driving force of the cargo apparatus is generated by a DC motor. For example, Japanese Laid Open Patent Application JP-P 2002-176706A discloses a forklift that uses a DC motor for driving a drive wheel and a DC motor as a steering assistant motor and a cargo apparatus driving motor, in order to improve the convenience and economic efficiency of the forklift. The merit of using the DC motor as the cargo apparatus driving motor is the simplicity of the control of the DC motor.

Recently, a technique using an induction motor controlled in accordance with a vector control for supplying the driving force of the cargo apparatus is proposed. In Japanese Laid Open Patent Application JP-A-Heisei, 7-107797, the vector control of the induction motor is explained.

The induction motor is applied for generating the driving force to the cargo apparatus of the forklift so that the generation efficiency of the driving force is improved. In the battery forklift, the battery is used as a power source. Thus, it is important that the necessary driving force can be generated by the small electric power.

However, the mechanism where the vector control is employed for controlling the induction motor for supplying the driving force of the cargo apparatus brings about the following two problems. First, the vector control is sensitive to the external disturbance. In the control of the cargo apparatus, it is important that the cargo apparatus directly reacts with the operation of a user. For example, when the user operates the cargo apparatus so as to raise a claw of the cargo apparatus, it is important that the claw is quickly raised in response to the operation. However, when the vector control is employed, the directness of the operational feeling is liable to be lost because of the sensitiveness to the external disturbance. For example, when the cargo apparatus is operated so as to raise the claw of the cargo apparatus, in a case where the cargo apparatus has a multiple-step mast, if the stage switching of the mast is carried out, the control system of the induction motor reacts with the stage switching. This drops the responsiveness to the operation of the user of the cargo apparatus. The second problem is the lack of the versatility of the control software of the induction motor. Even if the software of the vector control is prepared so as to match with a certain induction motor, the software cannot be employed for the control of the other induction motor in many cases. This is because the software of the vector control largely depends on the performance parameter of the induction motor. The lack of the versatility of the software is not desired in order to improve the productivity of the forklift.

From the viewpoint of the above mentioned background, the forklift which has the favorable response of the cargo apparatus to the operation of the user and has the high versatility of the control software of the induction motor for driving the cargo apparatus is desired.

SUMMARY OF THE INVENTION

It is therefore an object of the present invention to provide a forklift which has a favorable response to the operation of the user of the cargo apparatus.

Another object of the present invention is to provide a forklift which has a versatile control software of the induction motor for driving the cargo apparatus.

To accomplish the above mentioned purpose, the forklift according to the present invention adopts the VVVF control for controlling the induction motor which drives the hydraulic pump supplying the hydraulic pressure to the cargo apparatus. By adopting the VVVF control which is basically the open-loop control, the responsiveness of the cargo apparatus to the operation by a user can be improved. Further, the characteristic parameters are not necessary for the VVVF control basically, so that the versatility of the control software can be enhanced.

However, because the VVVF control is not torque-control, it is not suitable for controlling the induction motor which is exposed to load variations. It may be considered that the VVVF control is not suited for the induction motor which drives a hydraulic pump for supplying the hydraulic pressure to the cargo apparatus of a forklift, because it is exposed to load variations. However, the inventors discovered that it is possible to apply the VVVF control to the induction motor which drives a hydraulic pump supplying a hydraulic pressure to the cargo apparatus of a forklift by optimizing the generation of frequency instruction value or by controlling the ratio of the frequency instruction value and the voltage instruction value properly. The present invention is based on the discovery.

In an aspect of the present invention, a forklift includes a frequency instruction generation unit which generates a frequency instruction in response to an operation to a cargo apparatus operation unit, a voltage instruction generation unit which generates a voltage instruction from the frequency instruction by using VVVF control, an inverter control unit which generates an inverter control signal from the voltage instruction, an inverter which generates three-phase electric power in response to the inverter control signal, a hydraulic pump, an induction motor which drives the hydraulic pump by using the three-phase electric power and a cargo unit which is driven by a hydraulic pressure supplied from the hydraulic pump.

By this configuration, the responsiveness of the cargo apparatus to the operation by user can be improved by adopting the VVVF control which is basically the open-loop control.

In another aspect of the forklift according to the present invention, the frequency instruction generation unit is configured to generate the frequency instruction by control under which a slip defined by a difference between a frequency of the three-phase electric power and an rotation frequency of the induction motor being kept in a allowable range.

Preferably, the allowable range is changed in response to the frequency of the three-phase electric power.

In still another aspect, the frequency instruction generation unit includes a unit which generates a first frequency instruction in response to an operation to the cargo apparatus operation lever, a unit which generates a second frequency instruction to follow the first frequency instruction and a time change rate of which to be limited within a predetermined range, a unit which determines a minimum slip value which is the minimum value of the allowable range and a maximum slip value which is the maximum value of the allowable range based on the frequency instruction, a unit which determines a frequency instruction maximum value and a frequency instruction minimum value based on the minimum slip value and the maximum slip value and the rotation frequency of the induction motor and a unit which determines: (1) the frequency instruction maximum value as the frequency instruction when the second frequency instruction is over the frequency instruction maximum value; (2) the frequency instruction minimum value as the frequency instruction when the second frequency instruction is under the frequency instruction minimum value; and (3) otherwise, the second frequency instruction as the frequency instruction.

In the case that the forklift includes a power steering unit which assists the operation of a steering wheel driven by a hydraulic pressure supplied by the above mentioned hydraulic pump, the frequency instruction generation unit is preferably generates the frequency instruction in response to an operation to the handle for operating the steering wheel and independently from an operation to the cargo apparatus operation unit and the slip.

In still another aspect, the voltage instruction generation unit generates the voltage instruction in response to the frequency instruction and the slip. More concretely, the frequency instruction generation unit generates the voltage instruction so that the ratio of the voltage instruction to the frequency instruction is changed in response to the slip.

By this configuration, the control which can respond to the change in the load of the cargo apparatus with the VVVF control is accomplished.

One of the problems which can occur in the case that the VVVF control is applied to the induction motor to drive the hydraulic pump for supplying the hydraulic pressure to the cargo apparatus of the forklift is as follows: the conventional VVVF control is not suited for controlling an induction motor having the excessive magnetization property (namely, the induction motor having the property where the magnetization current when the slip is 0 is larger than the magnetization current when the slip is over 0). The conventional VVVF control cannot properly control the current supplied to the induction motor having the excessive magnetization property. This causes the problem when the reduction of the motor size is required for equipping a forklift with the induction motor. For the motor the volume of which is small, it is possible to assure the enough inductance. As a result, the motor must have the excessive magnetization property at the low slip for getting a required torque, especially under the low load condition. In such a case, in the conventional VVVF control, the relation that the current is small when the slip is small and the current is large when the slip is large is not be satisfied. Instead, the motor must be controlled by large current although the slip is small, that causes the extreme drop of the driving power generation efficiency of the motor.

To cope with this problem, the voltage instruction generation unit generates the voltage instruction for a ratio of the voltage instruction to the frequency instruction to be increased accompanying an increase of the magnitude (namely, the absolute value) of the slip. By applying this control, the relation that the current is small when the slip is small and the current is large when the slip is large is maintained so that the driving power generation efficiency of the motor is improved.

In still another aspect, the voltage instruction generation unit includes a high load table on which a correspondence relation between the voltage instruction and the frequency instruction is described and a low load table on which a correspondence relation between the voltage instruction and the frequency instruction is described. The voltage instruction generation unit generates a first voltage instruction from the frequency instruction by referring the high load table and a second voltage instruction from the frequency instruction by referring the low load table, and selects the first voltage instruction or the second voltage instruction as the voltage instruction.

By this configuration, the voltage instruction value is close to the value obtained mainly from the high load table when the slip is large, and to the value obtained mainly from the low load table when the slip is small. As a result, the relation that the control current is small when the slip is small and the control current is large when the slip is large can be maintained. This relation is desirable for improving the driving force generation efficiency of the motor.

The voltage instruction generation unit preferably generates the voltage instruction so that a change rate of the voltage instruction is below a predetermined change rate.

In addition, the inverter control unit preferably generates the inverter control signal so that the duty of the three-phase voltage to be supplied to the induction motor is 50%.

According to the present invention, a forklift, the responsiveness of whose cargo apparatus is good to the operation by a user of the cargo apparatus is provided.

Also, according to the present invention, a forklift whose control software of motor driving a cargo apparatus is highly versatile is provided.

DESCRIPTION OF THE PREFERRED EMBODIMENTS

A forklift according to an embodiment of the present invention will be described below in detail with reference to the attached drawings.

I. Total Configuration

Figure 1:
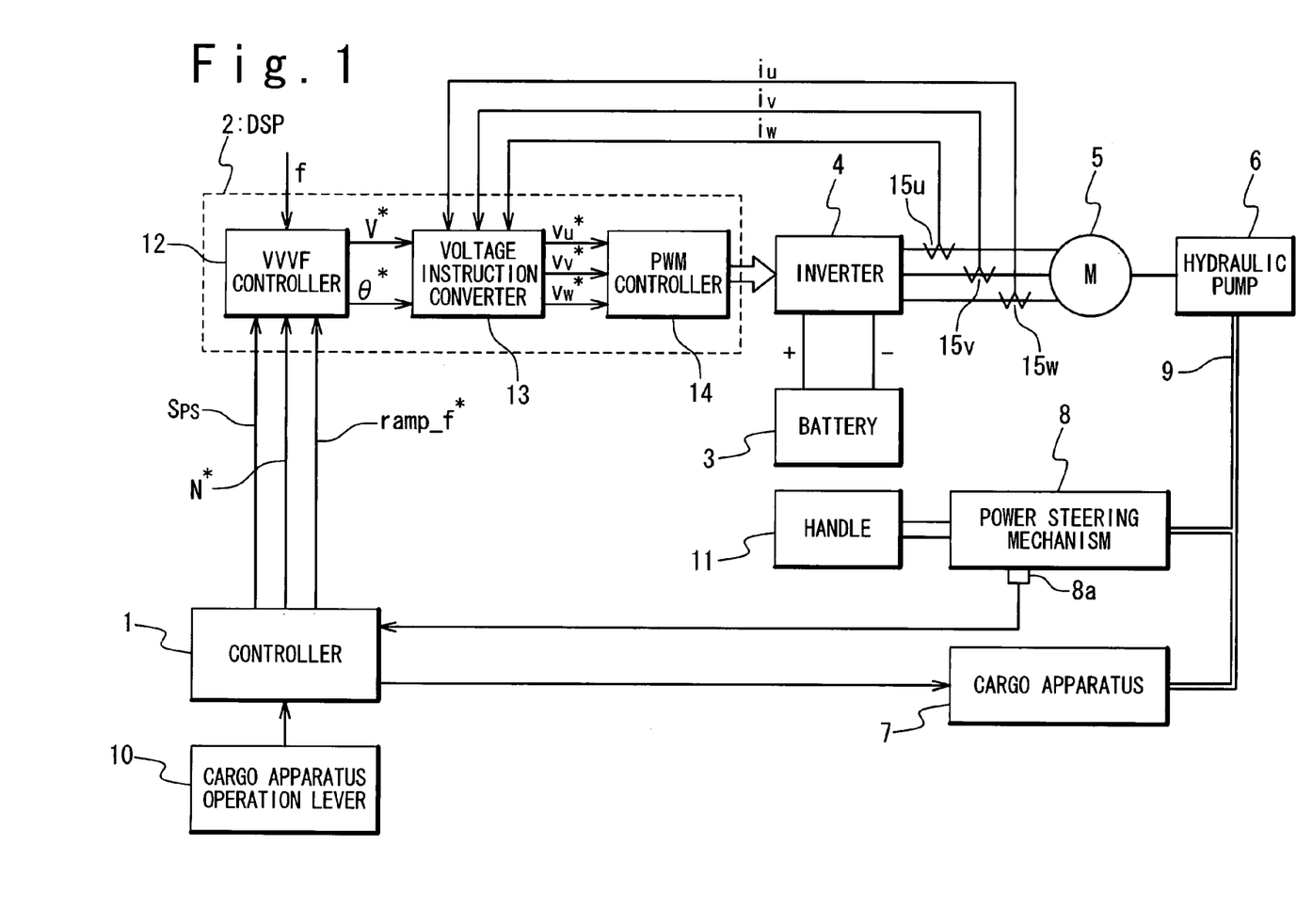
FIG. 1 is a block diagram showing the configuration of a forklift according to an embodiment of the present invention.

FIG. 1 is a block diagram showing the configuration of a forklift in this embodiment. The forklift includes a controller 1, a DSP (Digital Signal Processor) 2, a battery 3, an inverter 4, an induction motor 5, a hydraulic pump 6, a cargo apparatus 7 and a power steering mechanism 8. The controller 1 controls the whole system of the forklift. The cargo apparatus 7 is controlled by the controller 1. The DSP 2 controls the inverter 4 in response to control signals sent from the controller 1. As detailed later, the DSP 2 uses a VVVF (Variable Voltage Variable Frequency) control and a PWM (Pulse Width Modulation) control, in order to control the inverter 4. The battery 3 supplies a DC power to the inverter 4. The inverter 4 generates a three-phase AC power from the DC voltage sent from the battery 3, under the control of the DSP 2, and supplies to the induction motor 5.

The induction motor 5 transforms the three-phase AC power supplied from the inverter 4 to the driving power of the hydraulic pump 6. The hydraulic pump 6 is connected through a hydraulic circuit 9 to the cargo apparatus 7 and the power steering mechanism 8 and supplies the hydraulic pressure to the cargo apparatus 7 and the power steering mechanism 8. The cargo apparatus 7 carries out intended cargo actions by using the hydraulic pressure supplied from the hydraulic pump 6. As the cargo apparatus 7, a mast (not shown) having a claw for lifting up and down a load is typically used. The cargo apparatus 7 can be operated by operating a cargo apparatus operation lever 10. The power steering mechanism 8 is the mechanism for assisting the steering of the forklift. When the user operates a handle 11 to orient a steering wheel (not shown) of the forklift to a intended direction, the power steering mechanism 8 generates a torque for assisting the operation of the handle 11. A hydraulic sensor 8a for detecting the operation of the handle 11 is placed in the power steering mechanism 8. The hydraulic sensor 8a is placed at the position of the hydraulic circuit inside the power steering mechanism 8, where the hydraulic pressure is increased when the handle 11 is operated. The controller 1 recognizes the operation of the handle 11 from the output of the hydraulic sensor 8a. As described later, the controller 1 carries out the special control when the handle 11 is operated.

In the configuration of FIG. 1, the structure where one hydraulic pump 6 is used to supply the hydraulic pressure to both of the cargo apparatus 7 and the power steering mechanism 8 should be noted. Such configuration is useful for reducing the number of the parts of the forklift. On the other hand, in the configuration of FIG. 1, the induction motor 5 for driving the hydraulic pump 6 is required to be optimally controlled, in both of the case when the cargo apparatus operation lever 10 is operated and the case when the handle 11 is operated. As explained below in detail, the controller 1 and the DSP 2 are configured so as to optimally control the induction motor 5 in response to the operation of the cargo apparatus operation lever 10 and the operation of the handle 11.

One of the most important points of the forklift in this embodiment lies in the use of the VVVF control to control the induction motor 5 for driving the hydraulic pump 6. The VVVF control is not sensitive to the external disturbance, since the VVVF control is basically the open loop control. This effectively improves the responsiveness to the operation of the cargo apparatus operation lever 10 and makes the operability of the user better. In addition, since the VVVF control is high in versatility, the same control software can be used to control the various types of induction motors 5. This effectively improves the economic efficiency of the production of the forklift.

Concretely, the control of the induction motor 5 is carried out as follows. The controller 1 generates the three control signals, namely, a rotation number instruction N*, a frequency instruction change rate limit value ramp_f*, and a power steering on demand signal $S_{PS}$, in response to the operation of the cargo apparatus operation lever 10 and the operation of the handle 11. The rotation number instruction N* is the target value of the rotation number of the induction motor 5. The frequency instruction change rate limit value ramp_f* is the allowable maximum value of the change rate of a frequency instruction f* generated inside the DSP 2. The power steering on demand signal $S_{PS}$ is the signal generated in response to the operation of the handle 11. The controller 1, when detecting that the handle 11 is operated from the output of the hydraulic sensor 8a of the power steering mechanism 8, activates the power steering on demand signal $S_{PS}$. As described later, the power steering on demand signal $S_{PS}$ is used to generate the frequency instruction f* inside the DSP 2.

The DSP 2 generates the PWM signal $S_{PWM}$ for controlling the inverter 4, in response to the rotation number instruction N*, the frequency instruction change rate limit value ramp_f* and the power steering on demand signal $S_{PS}$. The PWM signal $S_{PWM}$ is the signal for controlling the on/off of a power transistor inside the inverter 4. The DSP 2 generates the PWM signal $S_{PWM}$ by using the VVVF control and the PWM control.

In detail, the DSP 2 includes a VVVF controller 12, a voltage instruction converter 13 and a PWM controller 14. The VVVF controller 12 generates a voltage instruction V* and a position instruction θ*, in response to the rotation number instruction N*, the frequency instruction change rate limit value ramp_f* and the power steering on demand signal $S_{PS}$. The voltage instruction converter 13 converts the voltage instruction V* and the position instruction θ* into three-phase voltage instructions, namely, a u-phase voltage instruction $v_u^*$, a v-phase voltage instruction $v_v^*$ and a w-phase voltage instruction $v_w^*$. The PWM controller 14 generates the PWM signal $S_{PWM}$ from the u-phase voltage instruction $v_u^*$, the v-phase voltage instruction $v_v^*$ and the w-phase voltage instruction $v_w^*$.

A safety mechanism for protecting the current supplied to the induction motor 5 from being excessive is installed in the voltage instruction converter 13. Concretely, current sensors 15u, 15v, 15w for measuring the u-phase current $i_u$, the v-phase current $i_v$ and the w-phase current $i_w$ of the induction motor 5, respectively, are placed on the power source interconnection for connecting the inverter 4 and the induction motor 5, and the measured values of the u-phase current $i_u$, the v-phase current $i_v$ and the w-phase current $i_w$ are reported to the voltage instruction converter 13. The voltage instruction converter 13, if at least one value of the u-phase current $i_u$, the v-phase current $i_v$ and the w-phase current $i_w$ becomes a setting value or more, determines the u-phase voltage instruction $v_u^*$, the v-phase voltage instruction $v_v^*$ and the w-phase voltage instruction $v_w^*$ so that the duty of the u-phase voltage $v_u$, the v-phase voltage $v_v$ and the w-phase voltage $v_w$ of the induction motor 5 becomes 50%. Since the duty of the u-phase voltage $v_u$, the v-phase voltage $v_v$ and the w-phase voltage $v_w$ becomes 50%, the voltage is never generated between any two phases. Thus, the u-phase current $i_u$, the v-phase current $i_v$ and the w-phase current $i_w$ are shut out. Such function is effective in order to make the safety of the forklift higher.

The function of the DSP 2, especially, the function of the VVVF controller 12 of the DSP 2 will be described below in detail.

II. Function of DSP

Figure 2:
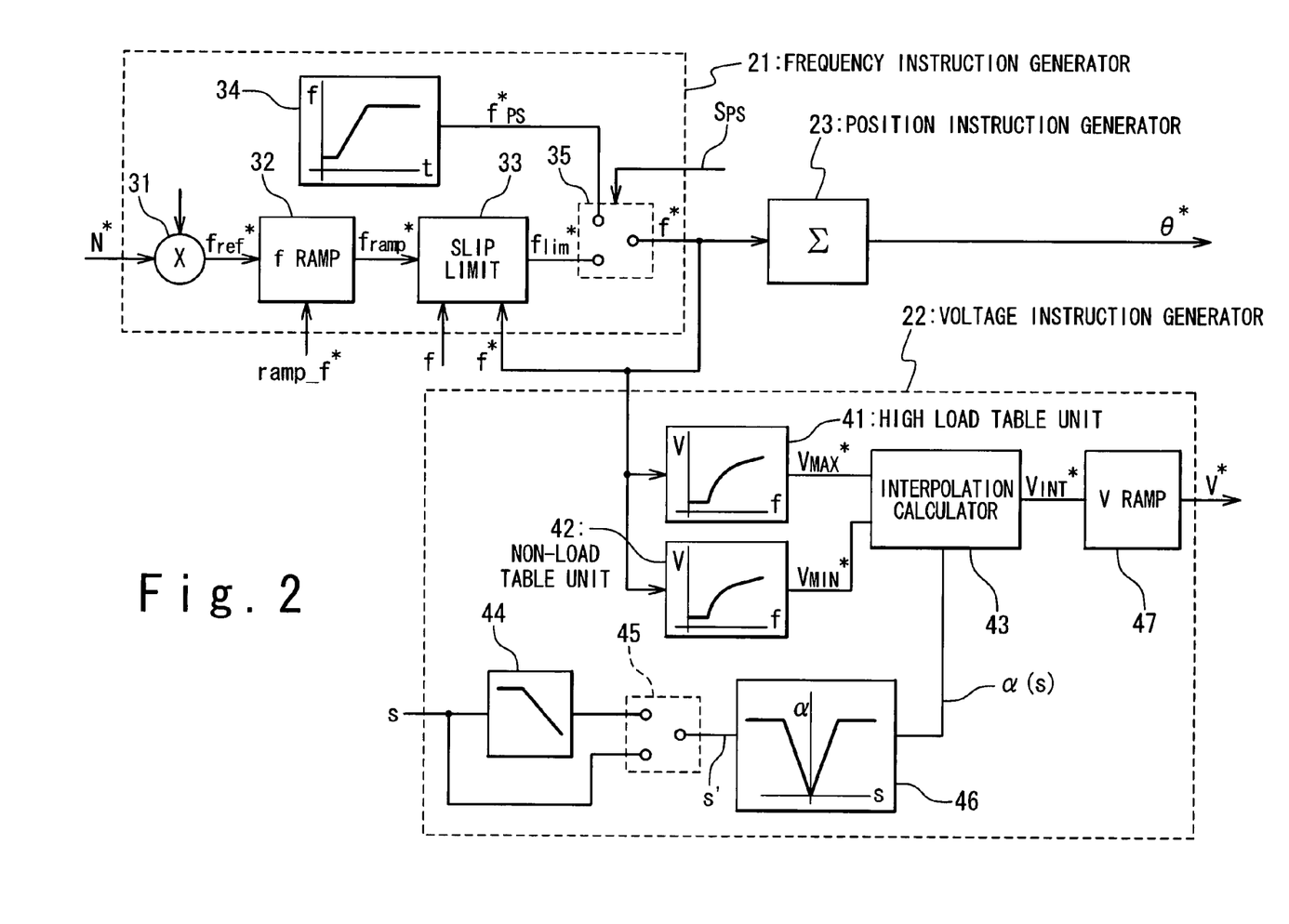
FIG. 2 is a functional block diagram showing the configuration and function of a VVVF controller of DSP installed in the forklift in this embodiment.

FIG. 2 is a functional block diagram of the VVVF controller 12 of the DSP 2. The VVVF controller 12 includes a frequency instruction generator 21, a voltage instruction generator 22 and a position instruction generator 23. The frequency instruction generator 21 generates the frequency instruction f* in response to the control signal (namely, the rotation number instruction N*, the frequency instruction change rate limit value ramp_f* and the power steering on demand signal $S_{PS}$) sent from the controller 1. The frequency instruction f* is the target value of the frequency of the three-phase AC power outputted by the inverter 4. The voltage instruction generator 22 generates the voltage instruction V* in accordance with the VVVF control from the frequency instruction f*. The position instruction generator 23 accumulates the frequency instructions f* and consequently generates the position instruction θ*. A clock signal is sent to the frequency instruction generator 21, the voltage instruction generator 22 and the position instruction generator 23. The operations of the frequency instruction generator 21, the voltage instruction generator 22 and the position instruction generator 23 are carried out in synchronization with this clock signal.

It should be noted that the frequency instruction generator 21, the voltage instruction generator 22 and the position instruction generator 23 may be attained by using any of the hardware, the software and the combination of them. Hereafter, it is assumed that the frequency instruction generator 21, the voltage instruction generator 22 and the position instruction generator 23 are realized as hardware.

1. Frequency Instruction Generator

The frequency instruction generator 21 is basically configured so as to generate the frequency instruction f* in response to the rotation number instruction N* sent from the controller 1 (namely, in response to the operation of the cargo apparatus operation lever 10).

As one of the important points in this embodiment, this frequency instruction f* is determined such that a slip s defined by a difference where an actual rotation frequency f of the motor is subtracted from the frequency of the three-phase AC power outputted by the inverter 4 is maintained within a predetermined range. In other words, by using an allowable value $S_{DEC}$ (>0) on a regenerative side of the slip s and an allowable value $S_{ACC}$ (>0) on a power running side, the frequency instruction f* is generated so as to keep the slip s between $-S_{DEC}$ and $S_{ACC}$. Such control is important in employing the VVVF control for the control of the induction motor 5 which supplies the driving force to the cargo apparatus 7. The VVVF control is typically considered to be suitable for the service where the load is stable, namely, the service where the induction motor is operated at a constant rotation number, because the speed control is carried out without any execution of a torque control. In the VVVF control, when the load is sharply changed, the voltage instruction is sharply changed, which easily brings about the generation of an excess current. Thus, the VVVF control is required to cope with the change in the load. In this embodiment, since the frequency instruction f* is generated in response to the slip s, it is possible to cope with the change in the load. For example, as the increase in the load of the cargo apparatus 7 increases the load of the induction motor 5, the slip s is increased. The frequency instruction f* is limited such that the slip s falls in a predetermined range. Consequently, it is possible to cope with the change in the load. In this way, in this embodiment, the frequency instruction f* is limited such that the slip s is in the predetermined range. Hence, it is possible to employ the VVVF control for the control of the induction motor 5 which supplies the driving force to the cargo apparatus 7.

However, when the power steering on demand signal $S_{PS}$ is activated by the operation of the handle 11, the other special control is executed. Concretely, after the power steering on demand signal $S_{PS}$ is activated, the frequency instruction generator 21 increases the frequency instruction f* in accordance with a predetermined pattern, independently of the rotation number instruction N* and the slip s, for a predetermined period. Such function enables the hydraulic pressure supplied to the power steering mechanism 8 to be quickly increased in response to the operation of the handle 11. It is useful to improve the operational feeling of the handle 11 that the hydraulic pressure supplied to the power steering mechanism 8 is quickly increased.

The function of the frequency instruction generator 21 will be described below in detail. Hereafter, it should be noted that the frequency instruction generated intermediately in the operational process for finally generating the frequency instruction f* is discriminated from the finally generated frequency instruction f* by giving a suffix.

The frequency instruction generator 21 includes a multiplier 31, an f ramp calculator 32, a slip limit calculator 33, an on demand table calculator 34 and a switcher 35. The multiplier 31 generates a a frequency instruction $f_{ref}*$ by multiplying the rotation number instruction N* by a predetermined coefficient. The f ramp calculator 32 has a role for making the change rate of the frequency instruction f* smaller than the frequency instruction change rate limit value ramp_f* sent from the controller 1. Concretely, the f ramp calculator 32 generates a frequency instruction $f_{ramp}*$ so as to follow the frequency instruction $f_{ref}*$ outputted by the multiplier 31 and make its change rate smaller than the frequency instruction change rate limit value ramp_f*. The limit value of the change rate of the frequency instruction $f_{ramp}*$ can be different between the case of the increase in the frequency instruction $f_{ramp}*$ and the case of the decrease. In this case, the controller 1 supplies a set of frequency instruction change rate limit values ramp_f* corresponding to the respective cases to the frequency instruction generator 21. The slip limit calculator 33 generates the frequency instruction $f_{lim}*$ so as to follow the frequency instruction $f_{ref}*$ outputted by the f ramp calculator 32 and keep the slip s between $-S_{DEC}$ and $S_{ACC}$. The slip limit calculator 33 will be described later in detail. The on demand table calculator 34 has a table, which describes the correspondence between the elapse time from the activation of the power steering on demand signal $S_{PS}$ and the frequency instruction f* to be outputted, and generates a frequency instruction $f_{ps}*$ of a predetermined period after the activation of the power steering on demand signal $S_{PS}$. The switcher 35 selects one of the frequency instruction $f_{lim}*$ generated by the slip limit calculator 33 and the frequency instruction $f_{ps}*$ generated by the on demand table calculator 34, as the frequency instruction f* to be finally generated, in response to the power steering on demand signal $S_{PS}$. The switcher 35 selects the frequency instruction $f_{lim}*$ as the frequency instruction f* if the power steering on demand signal $S_{PS}$ is not activated, and selects the frequency instruction $f_{ps}*$ as the frequency instruction f*, if the power steering on demand signal $S_{PS}$ is activated.

Figure 3:
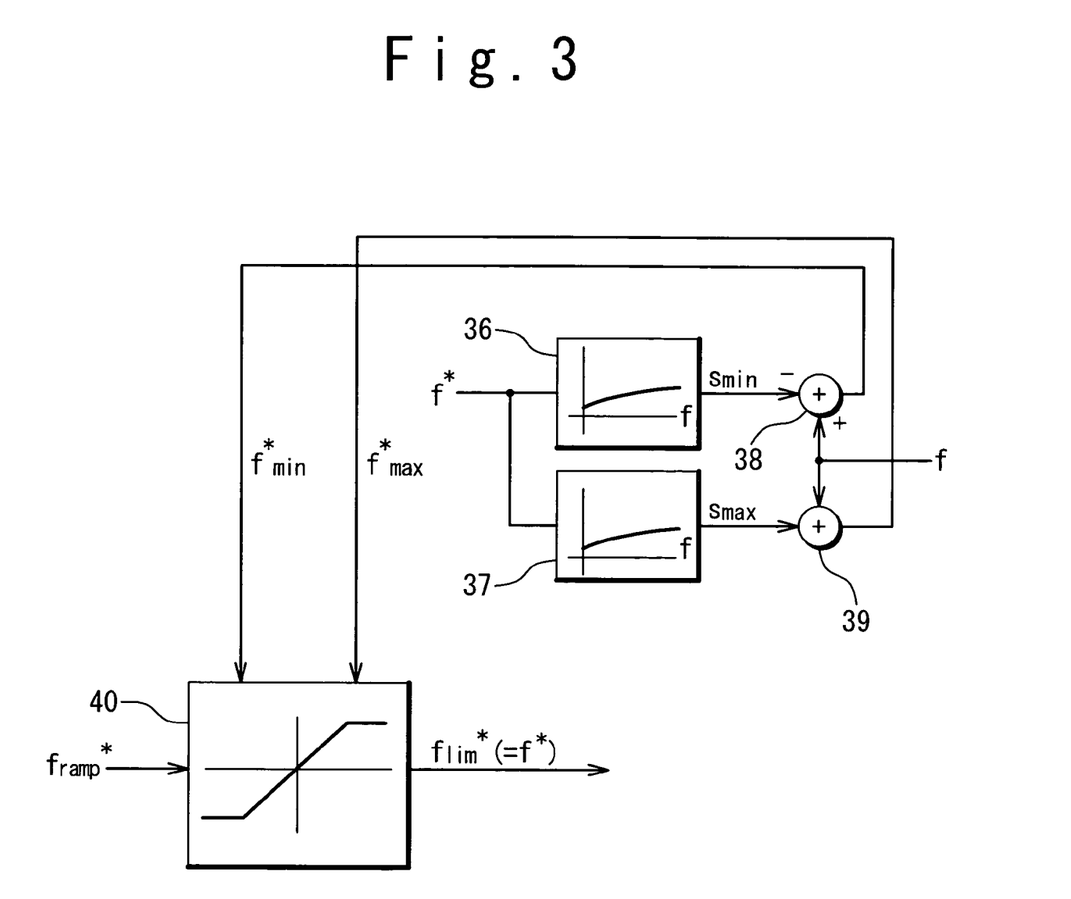
FIG. 3 is a functional block diagram showing the configuration and function of a slip limiting calculator of a VVVF controller.

FIG. 3 is a functional block diagram of the slip limit calculator 33. The slip limit calculator 33 has a regenerative side slip allowable value generator 36, a power running side slip allowable value generator 37, a subtracter 38, an adder 39 and a limiter 40.

The regenerative side slip allowable value generator 36 generates the allowable value $S_{DEC}$ (>0) of the slip s on the regenerative side from the frequency instruction f* one clock cycle before. The allowable value $S_{DEC}$ of the slip s on the regenerative side is generated so as to be monotonically increased for the frequency instruction f*. Similarly, the power running side slip allowable value generator 37 generates the allowable value $S_{ACC}$ (>0) of the slip s on the power running side from the frequency instruction f* one clock cycle before. The allowable value $S_{ACC}$ of the slip s on the power running side is also generated so as to be monotonically increased for the frequency instruction f*. The minimum value of the allowable range of the slip s is $-S_{DEC}$, and the maximum value is $S_{ACC}$. Thus, the allowable range of the slip s becomes wider with the increase in the frequency of the three-phase AC power outputted by the inverter 4.

The subtracter 38 generates the allowable minimum value $f_{min}^*$ of the frequency instruction f* by subtracting the allowable value $S_{DEC}$ of the slip s on the regenerative side from the rotation frequency f of the induction motor 5. Similarly, the adder 39 generates an allowable maximum value $f_{max}^*$ of the frequency instruction f* by subtracting the allowable value $S_{ACC}$ of the slip s on the regenerative side from the rotation frequency f of the induction motor 5 and consequently.

The limiter 40 generates the frequency instruction $f_{lim}^*$ so that the frequency instruction $f_{lim}^*$ has the value between the allowable minimum value $f_{min}^*$ and the allowable maximum value $f_{max}^*$ while following the frequency instruction $f_{ramp}^*$. In detail, if the frequency instruction $f_{ref}^*$ outputted by the f ramp calculator 32 is between the allowable minimum value $f_{min}^*$ and the allowable maximum value $f_{max}^*$, the frequency instruction $f_{ref}^*$ itself is outputted as the frequency instruction $f_{lim}^*$. On the other hand, if the frequency instruction $f_{ref}^*$ is smaller than the allowable minimum value $f_{min}^*$, the limiter 40 outputs the allowable minimum value $f_{min}^*$ as the frequency instruction $f_{lim}^*$. Moreover, if the frequency instruction $f_{ref}^*$ is greater than the allowable maximum value $f_{max}^*$, the limiter 40 outputs the allowable maximum value $f_{max}^*$ as the frequency instruction $f_{lim}^*$.

Since the frequency instruction $f_{lim}^*$ is generated as mentioned above, the frequency instruction f* is finally generated such that the slip s is within the allowable range (namely, the range between the minimum value $-S_{DEC}$ and the maximum value $S_{ACC}$).

As explained above, according to the configuration of the frequency instruction generator 21 shown in FIGS. 2 and 3, the frequency instruction f* is generated such that the slip s is within the certain allowable range. This is effective to cope with the variation in the load while employing the VVVF control. In addition, the range allowable for the slip s is optimally adjusted in accordance with the frequency of the three-phase AC power outputted by the inverter 4. Moreover, according to this configuration, the frequency instruction f* is generated such that the frequency instruction f* is quickly increased when the handle 11 is operated.

2. Voltage Instruction Generator

As mentioned above, the voltage instruction generator 22 schematically has the function for generating the voltage instruction V* through the VVVF control from the frequency instruction f*. However, as shown in FIG. 2, the voltage instruction generator 22 generates the voltage instruction V* so that the correspondence relation between the frequency instruction f* and the voltage instruction V* is variable on the basis of the slip s, differently from the typical VVVF control. If the magnitude of the slip s (namely, the absolute value of the slip s) is large, the ratio V*/f* between the frequency instruction f* and the voltage instruction V* is increased. On the contrary, if the magnitude of the slip s is small, the ratio V*/f* is decreased. Consequently, it is possible to effectively cope with the change in the load which may result in a problem when the VVVF control is employed.

In addition, such control is preferable in that the induction motor having the excessive magnetization property (namely, the induction motor having the property where the magnetization current when the slip is 0 is larger than the magnetization current when the slip is over 0) can be employed as the induction motor 5. The reduction of the volume of the induction motor is one of the basic requirements on the design of the forklift 1. However, there is a problem accompanying with the reduction of the volume of the induction motor. That is, the induction motor 5 has the excessive magnetization property, because the sufficient inductance cannot be obtained, if the volume of the induction motor 5 is set to be small, although the usual VVVF control is not suitable for the control of the induction motor having the excessive magnetization property. When the induction motor having the excessive magnetization property is controlled through the usual VVVF control, the control must be carried out under the large current although the slip is small. This greatly reduces the driving force generation efficiency of the induction motor. However, according to the control of this embodiment, when the magnitude of the slip s is large, the ratio V*/f* between the frequency instruction f* and the voltage instruction V* is increased, which can maintain the relation where the control is carried out under the small current if the slip is small or under the large current if the slip is large. Thus, according to the control of this embodiment, even if the induction motor 5 has the excessive magnetization property, it is possible to prevent the driving force generation efficiency of the induction motor 5 from being extremely reduced.

The function of the voltage instruction generator 22 will be described below in detail. Hereafter, it should be noted that the voltage instruction generated intermediately in the operational process for finally generating the voltage instruction V* is discriminated from the finally generated voltage instruction V* by giving a suffix.

Concretely, the voltage instruction generator 22 has a high load table unit 41, a non-load table unit 42, an interpolation calculator 43, a first order lag filter 44, a switcher 45, an override value generator 46 and a V ramp 47.

The high load table unit 41 generates the voltage instruction $V_{MAX}^*$ by using the high load table which shows the correspondence relation between the frequency instruction f* and a voltage instruction $V_{MAX}^*$ to be outputted when the load of the induction motor 5 is maximum. Similarly, the non-load table unit 42 generates the voltage instruction $V_{MIN}^*$ by using the low load table which shows the correspondence relation between the frequency instruction f* and a voltage instruction $V_{MIN}^*$ to be outputted when the load of the induction motor 5 is minimum (namely, at the time of non-load). The high load table and the low load table are determined such that in the high load table, the voltage instruction $V_{MAX}^*$ of the high load table corresponding to the same frequency instruction f* is larger than the voltage instruction $V_{MIN}^*$ of the low load table.

The interpolation calculator 43 generates the voltage instruction $V_{INT}^*$ by interpolation calculation using an override value α(s) sent from the override value generator 46. As described later, the override value α(s) is the value between 0 and 1, which is increased with the increase in the absolute value of the slip s. Concretely, the interpolation calculator 43 generates the voltage instruction $V_{INT}^*$ in accordance with the following equation.

$$V_{INT}^* = \alpha(s) V_{MAX}^* + \{1 - \alpha(s)\} V_{MAX}^*$$

The thus-determined voltage instruction $V_{INT}^*$ is increased with the increase in the slip s. This implies that the ratio V*/f* is also increased with the increase in the slip s.

The first order lag filter 44, the switcher 45 and the override value generator 46 are the function block for generating the override value α(s) in accordance with the slip s. The slip s is supplied to the first order lag filter 44. The switcher 45 supplies one of the slip s itself and the output of the first order lag filter 44 to the override value generator 46 in response to the change of the slip s. In detail, the switcher 45 supplies the output of the first order lag filter 44 to the override value generator 46, when the absolute value of the slip s is increased, and supplies the slip s itself to the override value generator 46, when the absolute value of the slip s is decreased. Hereafter, the value sent to the override value generator 46 from the switcher 45 is referred to as a slip s'. The override value generator 46 has a table (or a function) which describes the correspondence relation between the slip s' and the override value α(s), and generates the override value α(s) by using the table (or the function).

The V ramp 47 generates the voltage instruction V* to be finally outputted, so as to follow the voltage instruction $V_{INV}^*$ outputted by the interpolation calculator 43 and make its change rate smaller than a predetermined change rate. By virtue of the change rate of the voltage instruction V* being suppressed, the cargo apparatus 7 is protected from being excessively sharply operated. It is possible that the limit value of the change rate of the voltage instruction V* is set to be different between the case of the increase in the voltage instruction V* and the case of the decrease.

The voltage instruction generator 22 as configured above can generate the voltage instruction V* so that the correspondence relation between the frequency instruction f* and the voltage instruction V* is variable in response to the slip s. This is effective in order to cope with the variation in the load while employing the VVVF control. In addition, the voltage instruction generator 22 can generate the voltage instruction V* so that the ratio V*/f* between the frequency instruction f* and the voltage instruction V* is increased with the increase of the slip s. This is effective in order to employ the induction motor having the excessive magnetization property as the induction motor 5 and achieve the reduction of the size of the induction motor 5.

What is claimed is:

1. A forklift comprising:
   a frequency instruction generation unit which generates a frequency instruction in response to an operation to a cargo apparatus operation unit;
   a voltage instruction generation unit which generates a voltage instruction from said frequency instruction by using VVVF control;
   an inverter control unit which generates an inverter control signal from said voltage instruction;
   an inverter which generates three-phase electric power in response to said inverter control signal;
   a hydraulic pump;
   an induction motor which drives said hydraulic pump by using said three-phase electric power; and
   a cargo unit which is driven by a hydraulic pressure supplied from said hydraulic pump.

2. The forklift according to claim 1, wherein said frequency instruction generation unit is configured to generate said frequency instruction by control under which a slip defined by a difference between a frequency of said three-phase electric power and an rotation frequency of said induction motor being kept in a allowable range.

3. The forklift according to claim 2, wherein said allowable range is changed in response to said frequency of said three-phase electric power.

4. The forklift according to claim 2, wherein said frequency instruction generation unit includes:
   a unit which generates a first frequency instruction in response to an operation to said cargo apparatus operation unit;
   a unit which generates a second frequency instruction to follow said first frequency instruction and a time change rate of which to be limited within a predetermined range;
   a unit which determines a frequency instruction maximum value and a frequency instruction minimum value by using a minimum slip value which is a minimum value of said allowable range, a maximum slip value which is a maximum value of said allowable range and said rotation frequency of said induction motor; and
   a unit which determines:
   (1) said frequency instruction maximum value as said frequency instruction when said second frequency instruction is over said frequency instruction maximum value;
   (2) said frequency instruction minimum value as said frequency instruction when said second frequency instruction is under said frequency instruction minimum value; and
   (3) otherwise, said second frequency instruction as said frequency instruction.

5. The forklift according to claim 2, further comprising:
   a handle by which a steering wheel is operated; and
   a power steering unit which assists an operation of said steering wheel by using a hydraulic pressure supplied from said hydraulic pump,
   wherein said frequency instruction generating unit generates said frequency instruction in response to an operation to said handle and independently from an operation to said cargo apparatus operation unit and said slip.

6. The forklift according to claim 1, wherein said voltage instruction generation unit generates said voltage instruction in response to said frequency instruction and said slip.

7. The forklift according to claim 6, wherein a ratio of said voltage instruction to said frequency instruction is changed in response to said slip.

8. The forklift according to claim 7, wherein said voltage instruction generation unit generates said voltage instruction for a ratio of said voltage instruction to said frequency instruction to be increased accompanying an increase of said slip.

9. The forklift according to claim 8, wherein said voltage instruction generation unit includes:
   a high load table on which a correspondence relation between said voltage instruction and said frequency instruction is described; and
   a low load table on which a correspondence relation between said voltage instruction and said frequency instruction is described,
   wherein said voltage instruction generation unit generates a first voltage instruction from said frequency instruction by referring said high load table and a second voltage instruction from said frequency instruction by referring said low load table, and selects said first voltage instruction or said second voltage instruction as said voltage instruction.

10. The forklift according to claim 1, wherein said voltage instruction generation unit generates said voltage instruction so that a change rate of said voltage instruction is below a predetermined change rate.

11. The forklift according to claim 1, further comprising:
    a current sensor which detects a current supplied from said inverter to said induction motor, wherein said inverter control unit generates said inverter control signal so that a duty of a three-phase voltage to be supplied to said induction motor is 50%.

12. A control method of an induction motor of a forklift, configured to drive a cargo apparatus of said forklift in response to an operation to a cargo apparatus operation unit, comprising the steps of:

generating a frequency instruction in response to an operation to said cargo apparatus operation unit;

generating a voltage instruction from said frequency instruction by using VVVF control;

generating an inverter control signal; and controlling an inverter which is configured to generate an electric power supplied to said induction motor based on said inverter control signal.

* * * * *